US010650814B2

(12) United States Patent
Wang et al.

(10) Patent No.: US 10,650,814 B2
(45) Date of Patent: May 12, 2020

(54) INTERACTIVE QUESTION-ANSWERING APPARATUS AND METHOD THEREOF

(71) Applicant: Electronics and Telecommunications Research Institute, Daejeon (KR)

(72) Inventors: Ji Hyun Wang, Sejong-si (KR); Hyun Ki Kim, Daejeon (KR); Chung Hee Lee, Daejeon (KR); Soo Jong Lim, Daejeon (KR); Mi Ran Choi, Daejeon (KR); Sang Kyu Park, Daejeon (KR); Yong Jin Bae, Daejeon (KR); Hyung Jik Lee, Daejeon (KR); Joon Ho Lim, Daejeon (KR); Myung Gil Jang, Daejeon (KR); Jeong Heo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/797,354

(22) Filed: Oct. 30, 2017

(65) Prior Publication Data
US 2018/0151178 A1 May 31, 2018

(30) Foreign Application Priority Data

Nov. 25, 2016 (KR) .................. 10-2016-0158127
Oct. 30, 2017 (KR) .................. 10-2017-0142242

(51) Int. Cl.
*G06F 3/048* (2013.01)
*G10L 15/22* (2006.01)
(Continued)

(52) U.S. Cl.
CPC .......... *G10L 15/22* (2013.01); *G06F 16/3329* (2019.01); *G06F 16/44* (2019.01); *G06F 17/20* (2013.01); *G06N 5/04* (2013.01); *G06Q 30/0201* (2013.01); *G09B 7/02* (2013.01); *G10L 15/02* (2013.01); *G10L 15/1815* (2013.01);
(Continued)

(58) Field of Classification Search
None
See application file for complete search history.

(56) References Cited

U.S. PATENT DOCUMENTS 9,081,814 B1 7/2015 Carroll et al.
2009/0307159 A1* 12/2009 Pinckney ............... G06N 20/00
706/11
(Continued)

FOREIGN PATENT DOCUMENTS

KR 10-2011-0066357 6/2011
KR 10-2015-0017156 2/2015

*Primary Examiner* — William C Trapanese
(74) *Attorney, Agent, or Firm* — Kile Park Reed & Houtteman PLLC

(57) ABSTRACT

Provided are an interactive question answering apparatus and method, which improve an unnatural question sentence and prevent the impossibility of a question in a state which does not know additional information, thereby providing a multimodal-based question answering method enabling a person to provide a question like conversing. Also, a question answering service is exposed to potential product purchasers of content such as an image, video, audio, etc., thereby providing an environment available to advertisement market.

20 Claims, 14 Drawing Sheets

(51) Int. Cl.
  *G10L 15/02* (2006.01)
  *G10L 15/30* (2013.01)
  *G10L 15/18* (2013.01)
  *G06F 16/44* (2019.01)
  *G06F 16/332* (2019.01)
  *G06F 17/20* (2006.01)
  *G09B 7/02* (2006.01)
  *G06Q 30/02* (2012.01)
  *G06N 5/04* (2006.01)
  *G06F 3/0488* (2013.01)
  *G06F 3/16* (2006.01)

(52) U.S. Cl.
  CPC .......... *G10L 15/30* (2013.01); *G06F 3/04883* (2013.01); *G06F 3/167* (2013.01)

(56) References Cited

U.S. PATENT DOCUMENTS

| | | |
|---|---|---|
| 2011/0144452 A1 | 6/2011 | Shin et al. |
| 2011/0144999 A1 | 6/2011 | Jang et al. |
| 2012/0117090 A1 | 5/2012 | Lee et al. |
| 2014/0214410 A1 | 7/2014 | Jang et al. |
| 2014/0250120 A1 | 9/2014 | Mei et al. |
| 2014/0331241 A1* | 11/2014 | Barbieri ................ G06Q 30/02 725/5 |
| 2015/0046434 A1 | 2/2015 | Lim et al. |

* cited by examiner

FIG. 7

| ID | IMAGE FILE PATH | LEFT UPPER COORDINATES | RIGHT LOWER COORDINATES | URI | ENTITY ATTRIBUTE NAME |
|---|---|---|---|---|---|
| 1 | pic6.png | 48.0, 70.4 | 193.0, 95.2 | URI_50 | PICTURE |

| ID | VIDEO FILE PATH | START SECOND POSITION | END SECOND POSITION | URI | ENTITY ATTRIBUTE NAME |
|---|---|---|---|---|---|
| 10 | tvprogram3.avi | 540.45 | 800.02 | URI_100 | PLACE |
| 30 | tvshop12.avi | 212.04 | 260.54 | URI_201 | BAG |

| ID | AUDIO FILE PATH | START SECOND POSITION | END SECOND POSITION | URI | ENTITY ATTRIBUTE NAME |
|----|-----------------|----------------------|---------------------|---------|----------------------|
| 45 | sing21.mp3      | 0.0                  | 150.02              | URI_300 | SONG                 |
|    | 91              | 93                   | 95                  | 97      | 99                   |

INTERACTIVE QUESTION-ANSWERING APPARATUS AND METHOD THEREOF

CROSS-REFERENCE TO RELATED APPLICATIONS

This application claims priority under 35 U.S.C. § 119 to Korean Patent Application No. 10-2016-0158127, filed on Nov. 25, 2016, and No. 10-2017-0142242, filed on Oct. 30, 2017, the disclosure of which is incorporated herein by reference in its entirety.

TECHNICAL FIELD

The present invention relates to an interactive question answering apparatus and method, which provide a right answer to a question.

BACKGROUND

In a related art question answering apparatus, when hint information for obtaining an answer from an input question is insufficient in a process of obtaining the answer to the input question, a case incapable of obtaining an accurate answer occurs frequently. Therefore, in the related art question answering apparatus, a process of generating a question including the hint information is needed before a process of obtaining an answer to the question. For example, in a situation where a questioner is appreciating a specific work of art in a gallery, if the questioner desires to know a production year of the specific work of art, the questioner should a generate question sentence including a hint associated with an artist name or a title of the specific work of art to input the question sentence to the question answering apparatus. For example, if the questioner does not accurately know the artist name of the specific work of art or the time of the specific work of art, the questioner cannot generate an appropriate question sentence.

In order to solve such a problem, the related art question answering apparatus converses with a questioner through several turns, and thus, induces the questioner to generate an appropriate question. For example, if the questioner inputs a question including a short-length product name to the question answering apparatus, the question answering apparatus performs a process of checking with the questioner a name of a product which is highest in similarity to a name of a product, and the check process is repeatedly performed by performing conversation through several turns between the questioner and the question answering apparatus until searching for an accurate product.

As described above, in a question sentence input method performed by the related art question answering apparatus, even when a questioner does not know accurate information associated with a target to know, a question is finished through natural conversation between the questioner and the question answering apparatus.

However, such an interactive question sentence input method causes inconvenience due to conversation which is repeatedly performed through several turns between a questioner and the question answering apparatus.

SUMMARY

Accordingly, the present invention provides an interactive question answering apparatus and method, which provide an accurate answer sentence by using a natural question sentence as-is without generating a question sentence through conversation repeatedly performed between a questioner and a question answering apparatus.

In one general aspect, an interactive question answering method in a user terminal, including a computer processor communicating with a server over a communication network, includes: receiving, by the computer processor, multimedia content and meta-information about a plurality of entities, in which a user interests in the multimedia content, from the server; receiving, by the computer processor, a question sentence about an entity, selected from among the plurality of entities by the user, from the multimodal interface; extracting, by the computer processor, identification information about the entity selected by the user from the meta-information; and transmitting, by the computer processor, the identification information about the entity and the question sentence to the server and receiving an answer sentence, including a right answer candidate constrained by the identification information about the entity, as the answer sentence to the question sentence from the server.

In another general aspect, an interactive question answering method in a server, including a computer processor communicating with a user terminal over a communication network, includes: generating, by the computer processor, meta-information including identification information about a plurality of entities in which a user interests in multimedia content and attribute information assigned to the identification information; transmitting, by the computer processor, the multimedia content and the meta-information to the user terminal; receiving, by the computer processor, a question sentence about an entity selected from among the plurality of entities by the user and identification information about the entity, selected by the user and extracted from the meta-information, from the user terminal; and generating, by the computer processor, an answer sentence to the question sentence, based on attribute information assigned to the identification information about the entity selected by the user and transmitting the answer sentence to the user terminal.

In another general aspect, an interactive question answering apparatus includes a server, the server including: a storage unit storing multimedia content, meta-information including identification information about a plurality of entities in which a user interests in the multimedia content, and attribute information allocated to the identification information; and a computer processor transmitting the multimedia content and the meta-information to the user terminal, receiving a question sentence about an entity selected from among the plurality of entities by the user and identification information about the entity, selected by the user and extracted from the meta-information, from the user terminal, and generating an answer sentence to the question sentence to transmit the answer sentence to the user terminal, based on attribute information allocated to the identification information about the entity selected by the user.

Other features and aspects will be apparent from the following detailed description, the drawings, and the claims.

BRIEF DESCRIPTION OF THE DRAWINGS

FIGS. 7 to 9 are diagrams illustrating a data structure of meta-information according to embodiments of the present invention.

DETAILED DESCRIPTION OF EMBODIMENTS

Figure 1:
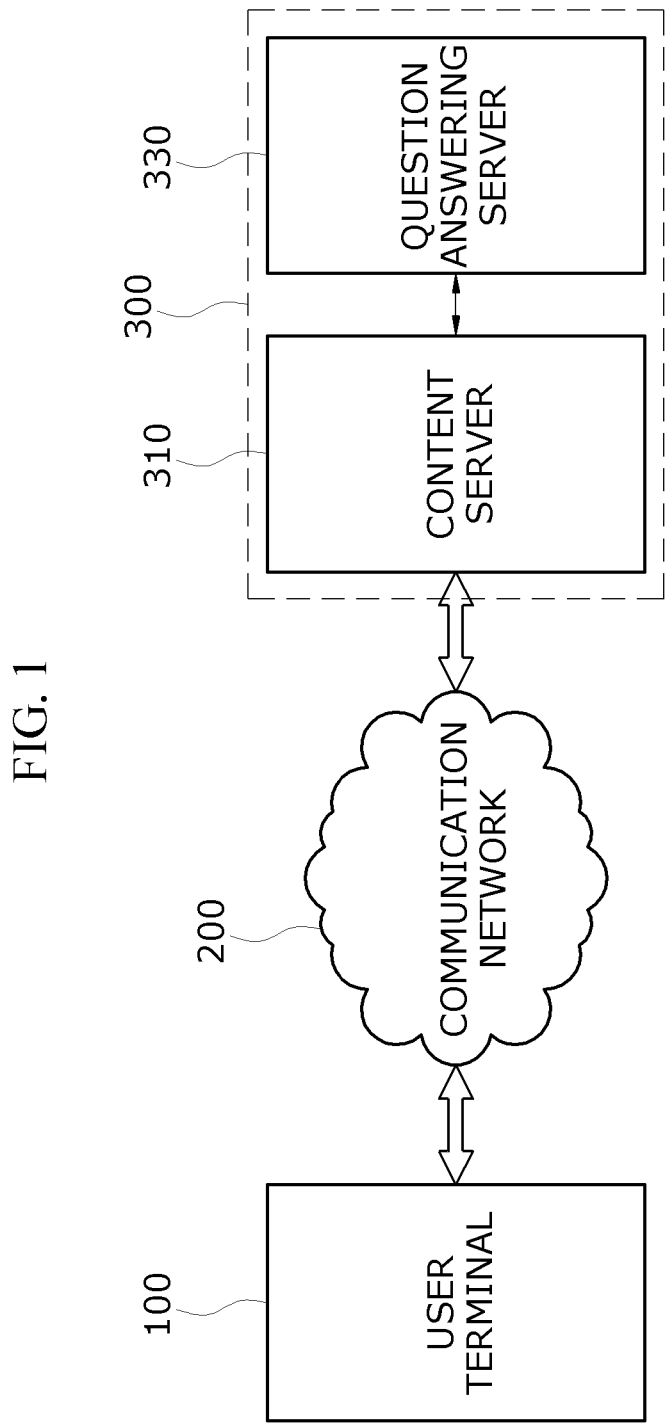
FIG. 1 is a block diagram of an interactive question answering apparatus according to an embodiment of the present invention.

Hereinafter, elements necessary to understand an operation and a function according to embodiments of the present invention will be described in detail with reference to the accompanying drawings. In describing embodiments, description on technology which is well known in the technical field of the present invention and is directly irrelevant to the present invention is omitted. This is for more clearly transferring subject matters of the present invention by omitting an unnecessary description in order not to obscure subject matters of the present invention.

Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout. It will be understood that although the terms including an ordinary number such as first or second are used herein to describe various elements, these elements should not be limited by these terms. These terms are only used to distinguish one element from another element.

Before describing embodiments of the present invention, the term "entity" described herein is defined.

The term "entity" is information which is predicted to attract interest of a user in multimedia content including an image, an audio, a video, etc., and is information which is not included in the multimedia content.

Examples of the entity may include a place name, an accident, a production year of a product, a person, home appliances, clothes, a name of an appearing actor, a producer, a place name, clothes worn on an appearing actor, shoes, a bag, price, a color, etc., but may further include various kinds depending on the kind of content without being limited thereto.

Hereinafter, an interactive question answering apparatus according to an embodiment of the present invention will be described in detail with reference to the accompanying drawings.

FIG. 1 is a block diagram of an interactive question answering apparatus according to an embodiment of the present invention.

Referring to FIG. 1, the interactive question answering apparatus according to an embodiment of the present invention may include a user terminal 100, a communication network 200, and a server 300.

The user terminal 100 may have a communication function which enables the user terminal 100 to access the communication network 200 and may communicate with the server 300.

The user terminal 100 may receive content and meta-information about the content from the server 300 over the communication network 200. The content may be multimedia content corresponding to various fields such as policy, economy, society, education, broadcast, entertainments, sports, home shopping, etc. The multimedia content may include image content, video content, and audio content. The meta-information may be information about a plurality of entities which are predicted to attract interest of a user in the content, and may be referred to as metadata. The meta-information may include identification information for identifying the plurality of entities. The identification information may be constructed to have an attribute of multimodal information output from a multimodal interface included in the user terminal 100.

The user terminal 100 may recognize a multimodal input received from the multimodal interface to generate a natural question sentence about an entity selected by the user from among the plurality of entities.

Examples of the multimodal input may include a voice input, a keyboard (or pen) input, a mouse input, a pen input, a touch screen input, a gesture input, etc., and in an embodiment of the present invention, for convenience, it is assumed that a natural question sentence is generated from a result of recognition based on a voice input or a keyboard (or pen) input. However, the present embodiment is not limited thereto, and the multimodal input may be implemented by using two or more different inputs or a plurality of inputs.

The user terminal 100 may extract identification information about the selected entity from meta-information received from the server 300 by using the multimodal interface.

The user terminal 100 may transmit the identification information about the entity and the natural question sentence to the server 300 over the communication network 200 and may receive an answer sentence to the question sentence from the server 300 over the communication network 200.

The identification information about the entity may largely increase a right answer probability of an answer sentence to the question sentence in the server 300. That is, the server 300 may constrain a right answer candidate, based on an attribute assigned to the identification information about the entity and may generate an answer sentence including the right answer candidate. Therefore, unlike the related art, the user terminal 100 according to an embodiment of the present invention may omit an undesired operation of changing a natural question sentence to an unnatural question sentence including a hint associated with the entity to increase a right answer probability of a right answer sentence.

The server 300 may include a content server 310 and a question answer server 330.

The content server 310 may be a server which a content provider operates.

The content server 310 may transmit multimedia content produced by the content provider to the user terminal 100 over the communication network 200.

The content server 300 may generate meta-information about a plurality of entities which are predicted to attract interest of a user in the multimedia content, and may transmit the meta-information and the multimedia content to the user terminal 100.

The content server 310 may receive identification information about an entity, which is selected by the user from among the plurality of entities by using the multimodal interface, and a question sentence about the entity selected by the user from the user terminal 100.

The question answer server 330 may receive the question sentence and the identification information about the entity from the content server 310 and may generate an answer sentence to the question sentence, based on attribute information allocated to the identification information about the entity.

The question answer server 330 may provide the answer sentence to the user terminal 110 through the content server 310.

Figure 2:
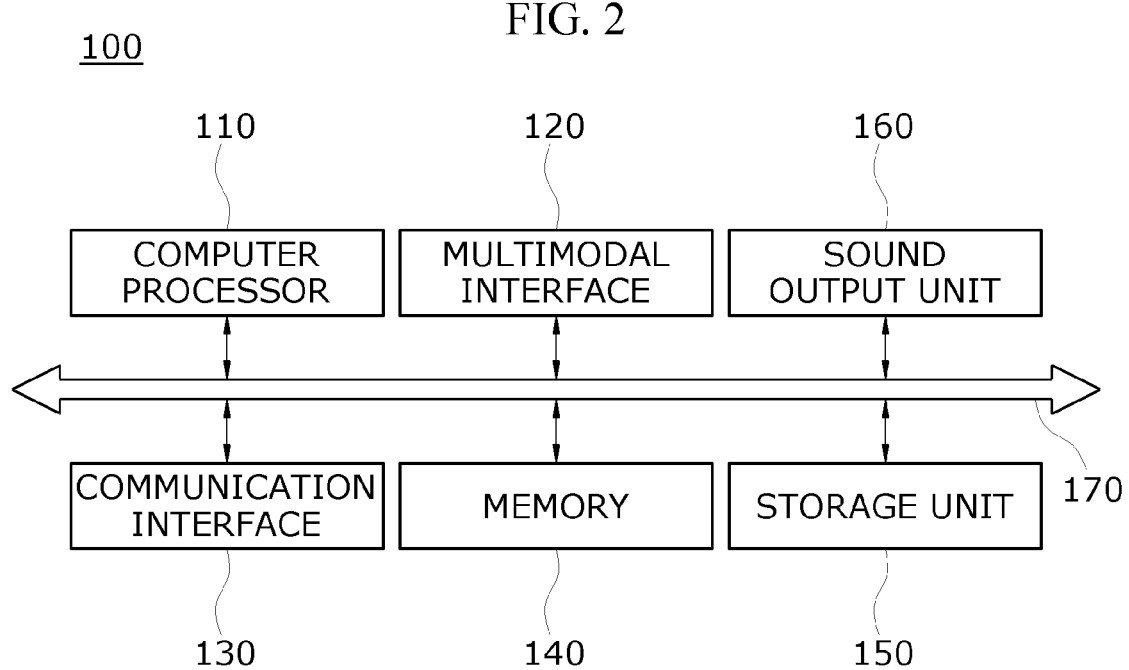
FIG. 2 is a block diagram of a user terminal illustrated in FIG. 1.

FIG. 2 is a block diagram of the user terminal illustrated in FIG. 1.

Referring to FIG. 2, the user terminal 100 may be implemented with a computing device having a communication function. Examples of the computing device may include smartphones, tablet personal computers (PCs), notebook computers, desktop PCs, wearable devices, and home appliances such as smart televisions (TVs), smart washing machines, and smart refrigerators having a communication function, and kiosks provided at shopping malls, tourist destinations, museums.

The user terminal 100 implemented with the computing device may include a computer processor 110, a multimodal interface 120, a communication interface 130, a memory 140, a storage unit 150, a sound output unit 160, and a bus 170 connecting the elements.

The computer processor 110 may control an overall operation of the user terminal 100.

The computer processor 110 may include at least one general-use processor for executing a plurality of algorithms. The general-use processor may include a graphics processor specialized for a graphics operation. The algorithms may include, for example, an algorithm associated with voice recognition, voice synthesis, image recognition, etc. The feature of the present invention is not limited to the algorithm, and technology known to those skilled in the art is applied to descriptions of the algorithms.

The computer processor 110 may analyze multimodal input information output from the multimodal interface 120 to recognize a multimodal input.

The computer processor 110 may generate a natural question sentence about an entity attracting interest of the user in the multimedia content transmitted from the server 300, based on the recognized multimodal input.

In order to generate the question sentence, the computer processor 110 may generate a question sentence from the multimodal input including a voice input and/or a keyboard (or pen) input.

For example, the computer processor 110 may recognize an uttering voice of the user, based on a voice recognition algorithm and may generate a text-form question sentence, based on a result of the recognition.

As another example, the computer processor 110 may recognize a keyboard (or pen) input and may generate a text-form question sentence, based on a result of the recognition. In order to recognize the keyboard input, the computer processor 110 may provide an input window for inputting a question sentence to a display screen included in the user terminal 100.

The computer processor 110 may extract identification information about an entity, in which the user interest, from the meta-information transmitted from the server 300, based on a recognition result obtained by recognizing the multimodal input.

In order to extract the identification information about the entity from the meta-information, for example, the computer processor 110 may receive touch coordinates of the entity selected by the user from the multimodal interface 120 and may extract the identification information about the entity, corresponding to the received touch coordinates, from the meta-information.

As another example, the computer processor 110 may calculate an input time when an uttering voice of the user corresponding to a question sentence is input from the multimodal interface 120, and may extract the identification information about the entity corresponding to the input time from the meta-information. Here, the input time when the uttering voice of the user is input may be a time which is counted from a reproduction start time of the multimedia content (video content or audio content). As another example, the computer processor 110 may calculate an input time when a keyboard (or pen) input corresponding to the question sentence is input, and may extract the identification information about the entity corresponding to the input time from the meta-information.

The multimodal interface 120 may generate pieces of multimodal input information about an entity selected by the user from among a plurality of entities included in the multimedia content.

Figure 3:
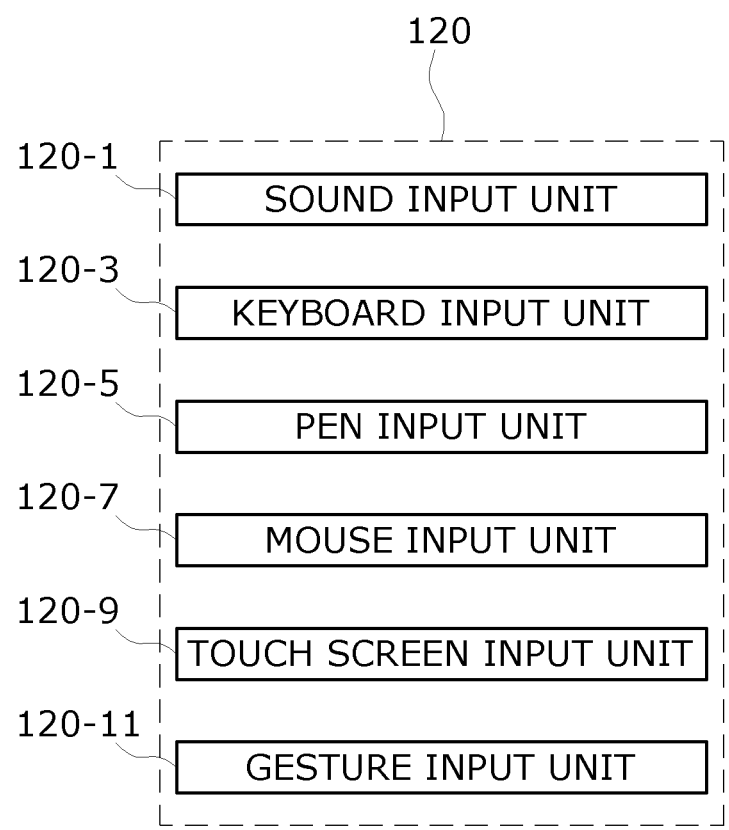
FIG. 3 is a block diagram of a multimodal interface illustrated in FIG. 2.

In order to generate the pieces of multimodal input information, as illustrated in FIG. 3, the multimodal interface 120 may include a sound input unit 120-1, a keyboard input unit 120-3, a pen input unit 120-5, a mouse input unit 120-7, a touch screen input unit 120-9, and a gesture input unit 120-11.

The sound input unit 120-1 may convert an uttering voice of the user corresponding to a question sentence into digital voice input information, and although not shown, may include a sound collector such as a microphone and an audio processor that converts an uttering voice of the user, collected by the sound collector, into voice input information.

The keyboard input unit 120-3 may include a keyboard which enables the user to directly typewrite a question sentence about an entity selected by the user.

The pen input unit 120-5 may include an electronic pen which enables the user to directly write the question sentence about the entity, selected by the user, on an input window provided on the display screen.

The mouse input unit 120-7 may include a mouse which enables the user to click a question sentence, desired by the user, of a question sentence list corresponding to the entity selected by the user. Here, the question sentence list may be provided by the server 300. The question sentence list may be a list which is generated through pre-learning and includes expectation question sentences about the entity selected by the user from the multimedia content.

The touch screen input unit 120-9 may include a touch screen for providing touch coordinates of the entity selected by the user or a display device equipped with a touch panel.

The gesture input unit 120-11 may include a wearable device for providing a gesture input for the entity selected by the user, an acceleration sensor and a gyro sensor attached on a human body, and a camera sensor for sensing a gesture of a user. The gesture may be, for example, a finger gesture where the user indicates a specific entity in content displayed on the display screen.

Referring again to FIG. 2, the communication interface 130 may interface the communication network 200 with the user terminal 100.

The communication interface 130 may convert information or data generated by the computer processor 110 according to a communication protocol defined in the communication network 200 and may transmit information or data, obtained through the conversion, to the server 300 by wire or wirelessly.

The memory 140 may provide a working space (i.e., a memory space) which enables the computer processor 110 to process information received from the multimodal interface 120 and information received from the server 300. The memory 140 may include a volatile memory and a nonvolatile memory.

The storage unit 150 may store the meta-information and the multimedia content received from the server 300.

The sound output unit 160 may convert an answer sentence received from the server 300 into a voice and may output the voice. The conversion may be performed based on a sound synthesis algorithm known to those skilled in the art.

Figure 4:
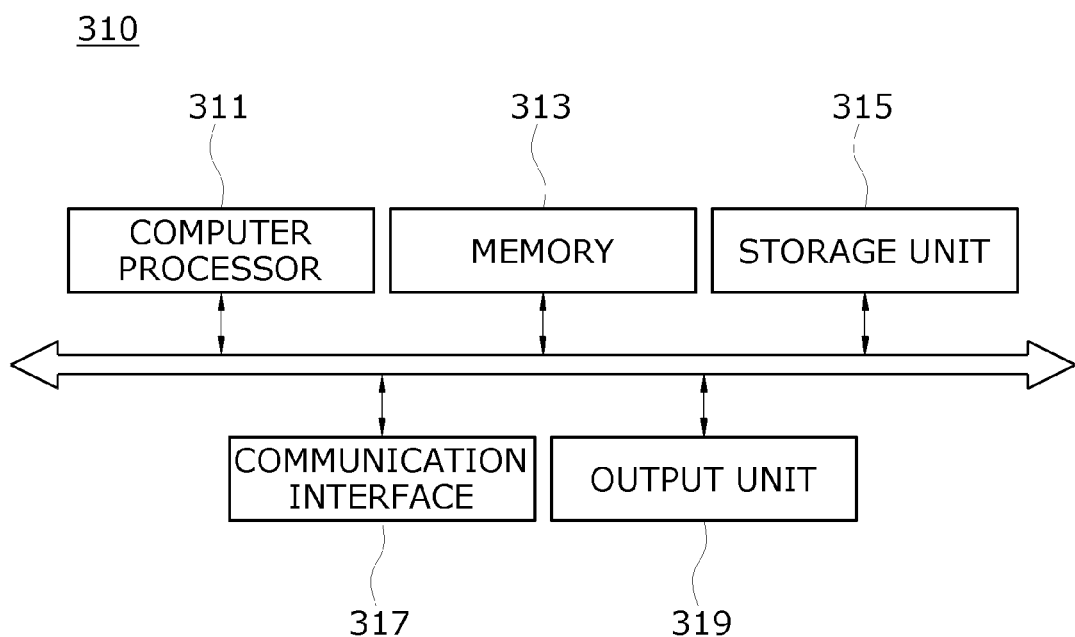
FIG. 4 is a block diagram of a content server illustrated in FIG. 1.

FIG. 4 is a block diagram of the content server illustrated in FIG. 1.

Referring to FIG. 4, the content server 310 may include a computer processor 311, a memory 313, a storage unit 315, a communication interface 317, and an output unit 319.

The computer processor 311 may control an overall operation of the content server 310.

The computer processor 110 may include at least one general-use processor for executing a plurality of algorithms. The general-use processor may include a graphics processor specialized for a graphics operation.

The computer processor 311 may generate meta-information about a plurality of entities in which a user interests in multimedia content and may store the generated meta-information in the storage unit 315.

The computer processor 311 may generate attribute information about the plurality of entities in which the user interests in the multimedia content and may store the generated attribute information in the storage unit 315.

In order to generate the meta-information, the computer processor 311 may classify the plurality of entities in which the user interests in the multimedia content. The classification of the entities may be performed by an entity classification model. The entity classification model may be a learning model which has learned a correlation between the multimedia content and entities which are predicted to attract interest of the user in the multimedia content. In order to learn the correlation, deep learning that is a type of machine learning may be used.

The computer processor 311 may allocate identification information to each of the plurality of entities classified based on the entity classification model to construct the meta-information.

The computer processor 311 may add attribute information including an attribute name and an attribute value to the identification information allocated to each of the plurality of entities classified based on the entity classification model.

The computer processor 311 may store the meta-information and the attribute information in the storage unit 315 along with the multimedia content.

Figure 5:
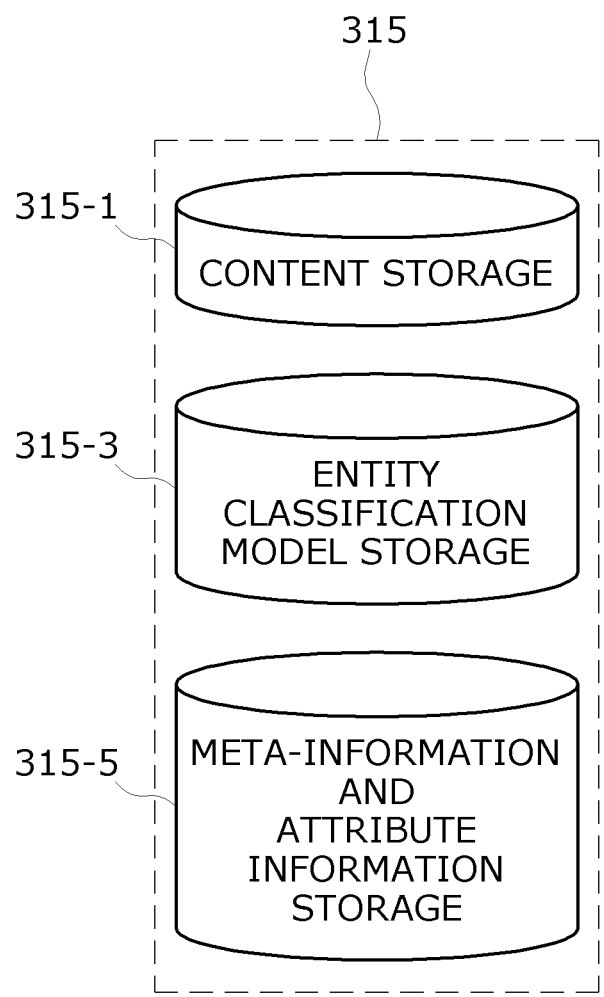
FIG. 5 is an example of pieces of information stored in a storage unit illustrated in FIG. 4.

The storage unit 315, as illustrated in FIG. 5, may include a storage 315-1 storing the multimedia content, a storage 315-3 storing the entity classification model, and a storage 315-5 storing the meta-information and the attribute information.

The computer processor 311 may control the communication interface 317 to transmit the multimedia content stored in the storage unit 315 and the meta-information about the multimedia content to the user terminal 100.

The computer processor 311 may control the communication interface 317 to transmit the multimedia content stored in the storage unit 315, the meta-information about the multimedia content, and the attribute information corresponding to the meta-information to the question answering server 330. Therefore, the content server 310 and the question answering server 330 may share the multimedia content stored in the storage unit 315, the meta-information about the multimedia content, and the attribute information corresponding to the meta-information.

The communication interface 317 may interface the communication network 200 with the content server 310. The communication interface 317 may convert the multimedia content and the meta-information about the multimedia content according to the communication protocol defined in the communication network 200, based on control by the computer processor 311 and may transmit data, obtained through the conversion, to the user terminal 100 by wire or wirelessly.

The computer processor 311 may receive identification information about an entity selected by the user and a question sentence about the entity selected by the user from the user terminal 100 and may transmit the identification information and the question sentence to the question answering server 330.

The memory 313 may provide a working space which enables execution of a program, an execution command, and/or the like applied to the computer processor 311 for generating the meta-information.

The output unit 319 may include a display device, which displays the meta-information generated by the computer processor 311 to a server manager, and an audio device that outputs an audio.

Figure 6:
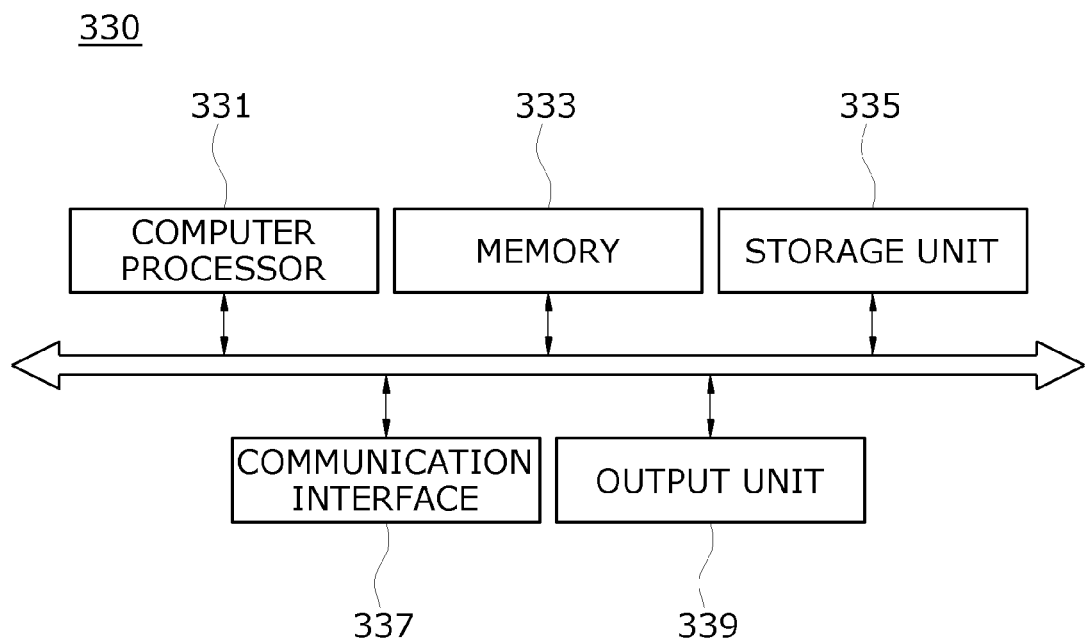
FIG. 6 is a block diagram of a question answering server illustrated in FIG. 1.

FIG. 6 is a block diagram of the question answering server illustrated in FIG. 1.

Referring to FIG. 6, the question answering server 330 may receive identification information about an entity selected by a user in multimedia content and a question sentence about the entity selected by the user from the content server 310, generate an answer sentence to the received question sentence, based on attribute information assigned to the entity, and transmit the generated answer sentence to the user terminal 100 through the content server 310. At this time, the question answering server 330 may directly transmit the generated answer sentence to the user terminal 100 without undergoing the content server 310.

To this end, the question answering server 330 may include a computer processor 331, a memory 333, a storage unit 335, a communication interface 337, and an output unit 339.

The computer processor 331 may control an overall operation of the question answering server 330 and may generate an answer sentence to the question sentence received from the content server 310. At this time, the computer processor 331 may generate the answer sentence to the question sentence, based on the attribute information corresponding to the identification information which is received from the content server 310 along with the question sentence.

In order to generate the answer sentence, the computer processor 331 may execute a question answering algorithm. That is, the question answering algorithm executed by the computer processor 331 may generate the answer sentence by using a database which stores the attribute information assigned to the identification information received from the content server 310. A question answering process performed based on the question answering algorithm will be described below in detail.

The memory 333 may provide an execution space for the question answering algorithm executed by the computer processor 331 and may include a volatile memory and a non-volatile memory.

The storage unit 150 may store meta-information provided from the content server 310 and attribute information corresponding to the meta-information.

The communication interface 337 may interface the question answering server 330 with the content server 310.

The output unit 339 may include a display device, which displays the meta-information generated by the computer processor 311, and an audio device that outputs an audio.

In an embodiment of the present invention, the content server 310 and the question answering server 330 are described as individual elements separated from each other, but may be integrated into one server without being limited thereto.

FIGS. 7 to 9 are diagrams illustrating a data structure of meta-information according to embodiments of the present invention.

Figure 10:
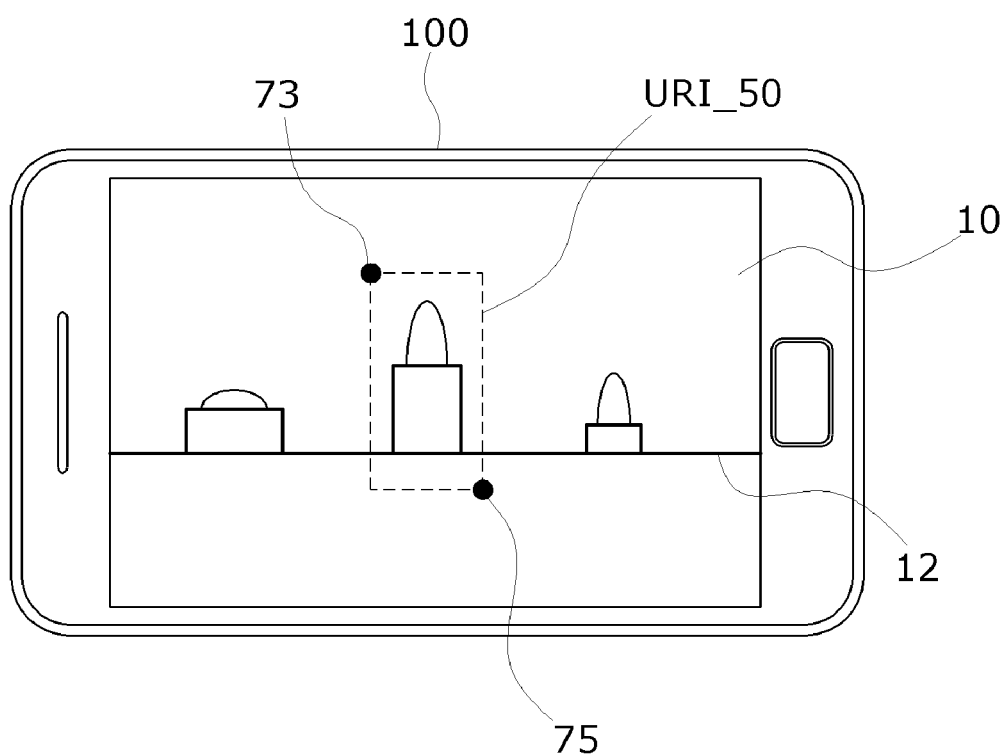
FIG. 10 is a diagram for describing screen coordinates illustrated in FIG. 7.

In FIG. 7, when multimedia content is image content, a data structure of meta-information is illustrated. The meta-information in an image may include an image file path 71, screen coordinates 73 and 75 of an entity which is included in the image is located on a display screen, a uniform resource identifier (URI) 77 of the entity, and an entity attribute name 79. Here, in a case of defining a virtual tetragonal area surrounding the entity, the screen coordinates 73 and 75 may include left upper coordinates 73 corresponding to a left upper corner of the tetragonal area and right lower coordinates 75 corresponding to a right lower corner of the tetragonal area. In FIG. 10, an example of the screen coordinates is illustrated. An image displayed on a display screen 10 of the user terminal 100 may be an image corresponding to three bags arranged on a display table, and in the image, an entity may be a bag. If touch coordinates of the display screen 10 which are touched by a user for selecting a middle-positioned bag from among the three bags are located in the tetragonal area including the left upper coordinates 73 and the right lower coordinates 75, the user terminal 100 may recognize an entity where the user has selected the middle-positioned bag, and may extract a uniform resource identifier URI_50 of the recognized entity from the meta-information. The user terminal 100 may transmit the extracted uniform resource identifier URI_50 and a question sentence about the entity to the server 300. In this case, the question sentence may be "how much is the bag". The question sentence may not include hint information about a product number, a size, and a color of the bag, but the uniform resource identifier URI_50 may be used as the hint information. Therefore, the user terminal 100 may omit a process of changing a natural question sentence to an unnatural question sentence including the hint information about the product number, the size, and the color of the bag.

In FIG. 8, when multimedia content is video content, a data structure of meta-information is illustrated. The meta-information in the video content may include a video file path 81, time sections 83 and 85 where an entity in which a user interests in the video content is reproduced, a URI 87 of the time section, and an entity attribute name 89 allocated to the URL 87. The time sections 83 and 85 may include a reproduction start time 83 and a reproduction end time 85. When the user desires to know a place name displayed in the currently reproduced video content, a question sentence may be "where the place is". Here, in a case where an input time when a user utterance voice corresponding to the question sentence is input is between the reproduction start time 83 and the reproduction end time 85, the user terminal 100 may extract a uniform resource identifier URI_100 allocated to the time sections 83 and 85 defining the reproduction start time 83 and the reproduction end time 85 in the meta-information illustrated in FIG. 8. The user terminal 100 may transmit the question sentence and the uniform resource identifier URI_100 to the content server 310.

In FIG. 9, when multimedia content is audio content, a data structure of meta-information is illustrated. The meta-information in the audio content may include an audio file path 91, time sections 93 and 95 where an entity in which a user interests in the audio content is reproduced, a URI 97 of the time section, and an entity attribute name 99 allocated to the URL 97. Similarly to the above-described method of extracting the uniform resource identifier from the video content, the user terminal 100 may extract a question sentence about an entity selected by the user in the audio content and a URI of the entity from the meta-information. In the audio content, a type of the entity may be "a song title", and a type of the question sentence may be "a title of a currently reproduced song?".

Figure 11:
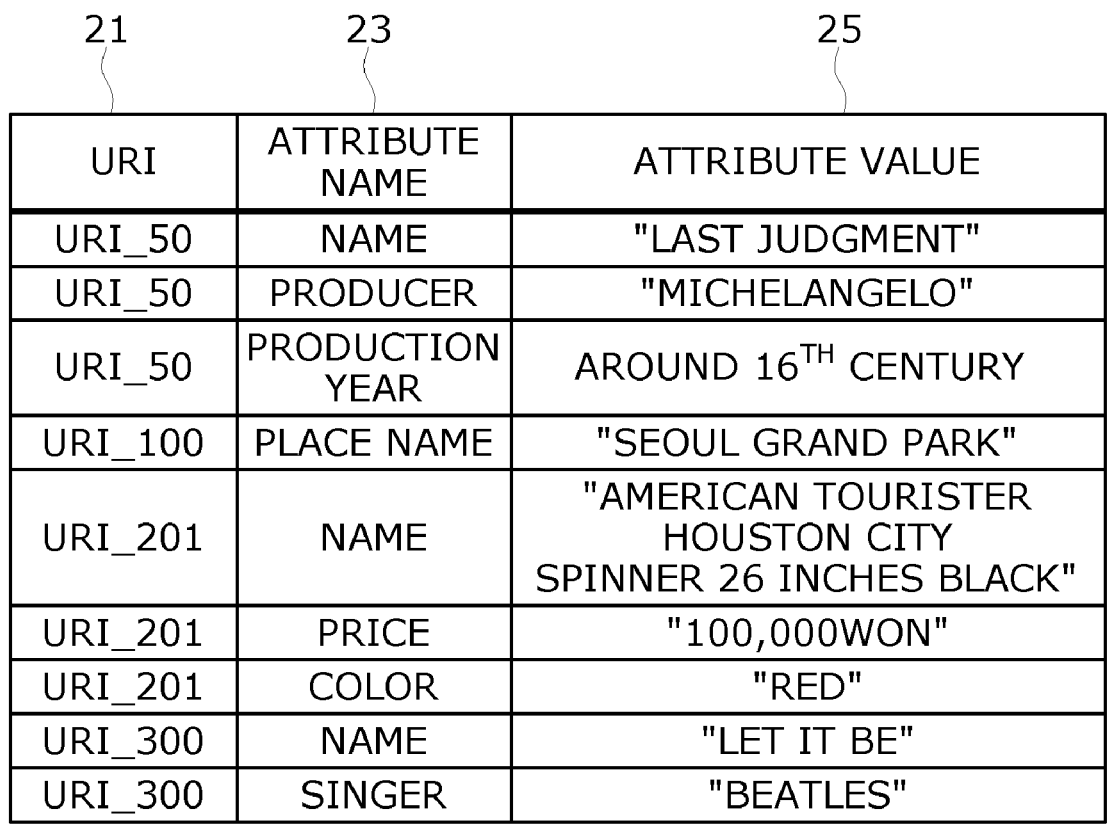
FIG. 11 is a diagram illustrating a data structure of attribute information according to an embodiment of the present invention.

FIG. 11 is a diagram illustrating a data structure of attribute information according to an embodiment of the present invention.

Referring to FIG. 11, attribute information may be information which the content server 310 and the question answering server 330 share, and may include an attribute name 23 and an attribute value 25 allocated to the uniform resource identifier 21. Two or more attribute names 23 and attribute values 25 may be allocated to the same uniform resource identifier URI_50. For example, three attribute names consisting of a name, a producer, and a production year and three attribute values consisting of "Last Judgment", "Michelangelo", and "around 16$^{th}$ century" respectively corresponding to the three attribute names may be allocated to an entity where a URI is URI_50. Also, two attribute names consisting of a name and a singer and two attribute values consisting of "LET IT BE" and "Beatles" respectively corresponding to the two attribute names may be allocated to an entity where a URI is URI_300.

In the above-described embodiment, it has been described that the content server 310 generates attribute information and provides the attribute information to the question answering server 330, but the present embodiment is not limited thereto. In other embodiments, the question answering server 330 generates the attribute information and provides the attribute information to the content server 310, and in this case, the question answering server 330 may generate meta-information and may provide the meta-information to the content server 310.

Figure 12:
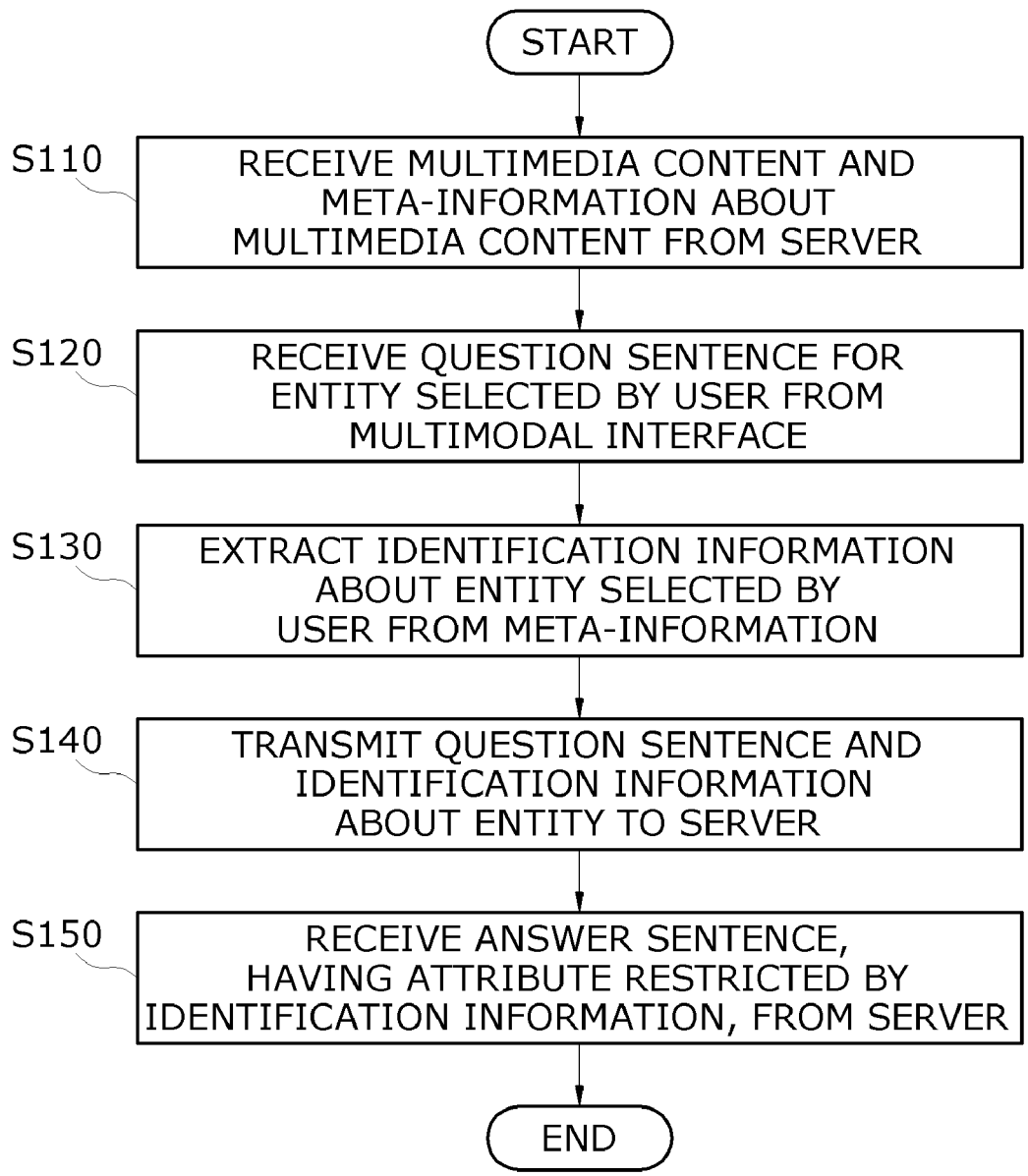
FIG. 12 is a flowchart illustrating a question answering method in a user terminal according to an embodiment of the present invention.

FIG. 12 is a flowchart illustrating a question answering method in a user terminal according to an embodiment of the present invention, and it is assumed that an element for performing each of the following steps is the computer processor 110 included in the user terminal 110.

Referring to FIG. 12, first, in step S110, the computer processor 110 may receive multimedia content and meta-information about the multimedia content from the server 300. Here, the meta-information may be information about a plurality of entities in which a user interests in the multimedia content, and may be information for identifying the plurality of entities.

Subsequently, in step S120, the computer processor 110 may receive a question sentence about an entity, selected by the user from among the plurality of entities, from the multimodal interface 120. The question sentence may be provided by the sound input unit, the keyboard input unit, and the pen input unit included in the multimodal interface 120.

Subsequently, in step S130, the computer processor may extract identification information about the entity, selected by the user, from the meta-information. An example of extracting the identification information about the entity from the meta-information may include a process of receiving, by the computer processor, multimodal input information for identifying the entity selected by the user from the multimodal interface, a process of searching for the identification information about the entity corresponding to the multimodal input information in the meta-information, and a process of extracting the found identification information from the meta-information. Another example of extracting the identification information about the entity from the meta-information may include a process of, when the multimedia content is video content, calculating an input time when a user utterance voice corresponding to the question sentence is input, based on a reproduction start time of the video content and a process of extracting a uniform resource identifier of an entity, reproduced at the calculated input time, from the meta-information. Another example of extracting the identification information about the entity from the meta-information may include a process of calculating an input time when a user voice corresponding to the question sentence is input from the multimodal interface, based on a reproduction start time of the audio content and a process of extracting a uniform resource identifier of an entity, included in the audio content and reproduced at the calculated input time, from the meta-information.

Subsequently, in step S140, the question sentence and the identification information about the entity may be transmitted to a server.

Subsequently, in step S150, the computer processor may receive an answer sentence to the question sentence from the server. In this case, the answer sentence may include the identification information about the entity or a plurality of right answer candidates constrained by attribute information assigned to the identification information about the entity.

Figure 13:
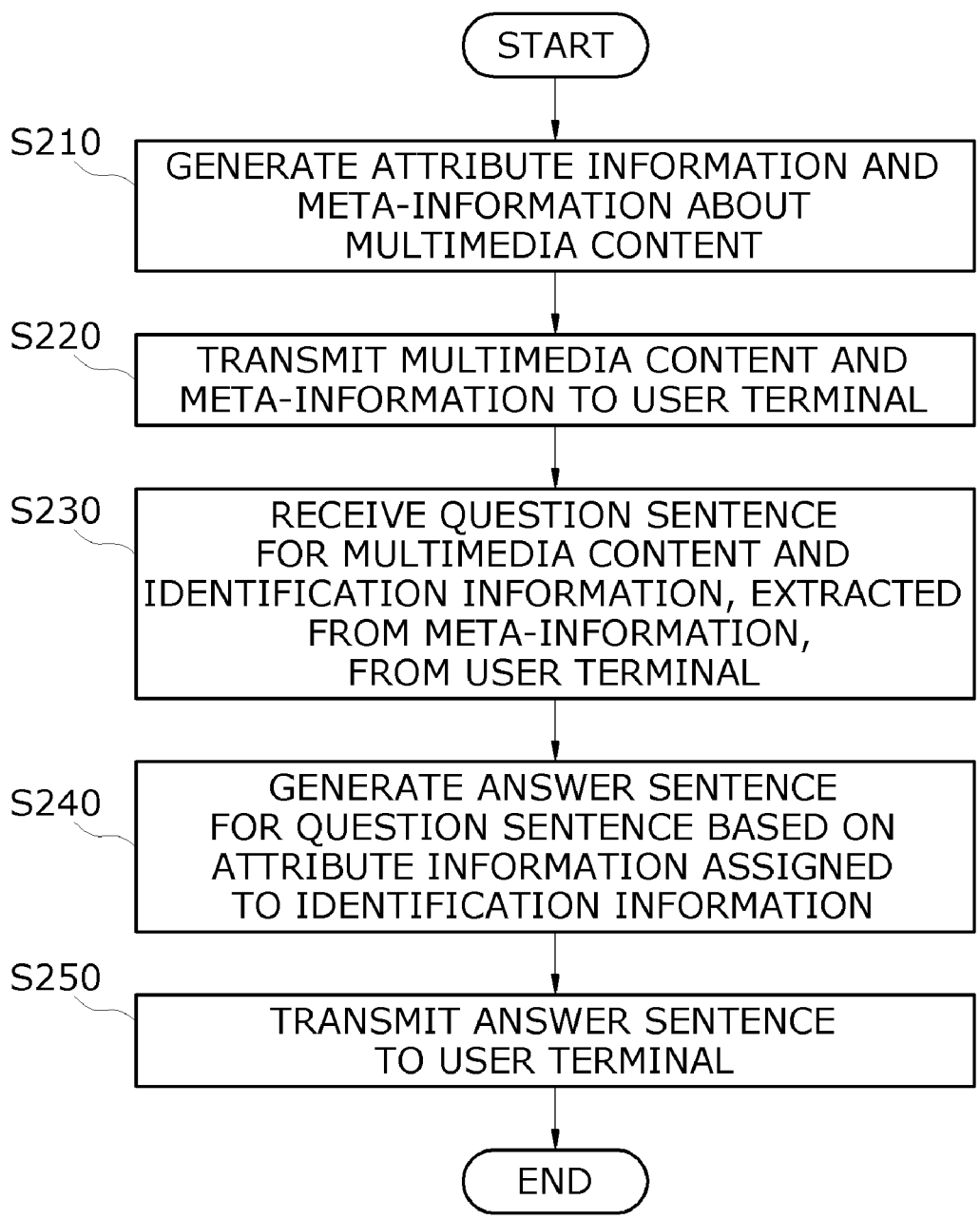
FIG. 13 is a flowchart illustrating a question answering method in a server according to an embodiment of the present invention.

FIG. 13 is a flowchart illustrating a question answering method in a server according to an embodiment of the present invention, and for convenience of description, it is assumed that the following steps are performed by one server into which the content server 310 and the question answering server 330 are integrated. However, in a case of classifying elements for performing the following elements, an element for performing steps S210 to S230 may be the content server 310 illustrated in FIG. 1, and an element for performing steps S240 and S250 may be the question answering server 330 illustrated in FIG. 1.

Referring to FIG. 13, first, in step S210, the server 300 may generate attribute information and meta-information about multimedia content. The meta-information may include identification information about a plurality of entities in which a user interests in the multimedia content. A method of generating the meta-information may include a process of, by using a pre-learned entity classification model, classifying a plurality of entities which are predicted to attract interest of the user in the multimedia content, a process of generating the identification information including an attribute of multimodal input information, for comparing identification information about each of the classified plurality of entities and the multimodal input information output from the multimodal interface, and a process of generating the meta-information including the generated identification information. The identification information included in the meta-information may include a uniform resource identifier of each of the plurality of entities, screen coordinates at which each of the plurality of entities is displayed on a display screen of the user terminal, a time section where video content including the plurality of entities is reproduced, a time section where audio content including the plurality of entities is reproduced, and an attribute name representing an attribute of each of the plurality of entities. The attribute information may include an attribute name and an attribute value allocated to the uniform resource identifier. The description made above with reference to FIG. 11 is applied to an example of the attribute name and the attribute value.

Subsequently, in step S220, the server 300 may transmit the multimedia content and the meta-information to the user terminal 100.

Subsequently, in step S230, the server 300 may receive a question sentence about an entity selected by the user from among the plurality of entities and identification information about the entity, selected by the user and extracted from the meta-information, from the user terminal.

Subsequently, in step S240, the server 300 may generate an answer sentence to the question sentence, based on attribute information (an attribute name and an attribute value) allocated to the identification information about the entity selected by the user. That is, the server 300 may generate the answer sentence including a right answer candidate constrained by the attribute information allocated to the identification information about the entity selected by the user.

Subsequently, in step S250, the server 300 may transmit the answer sentence to the user terminal 100.

Figure 14:
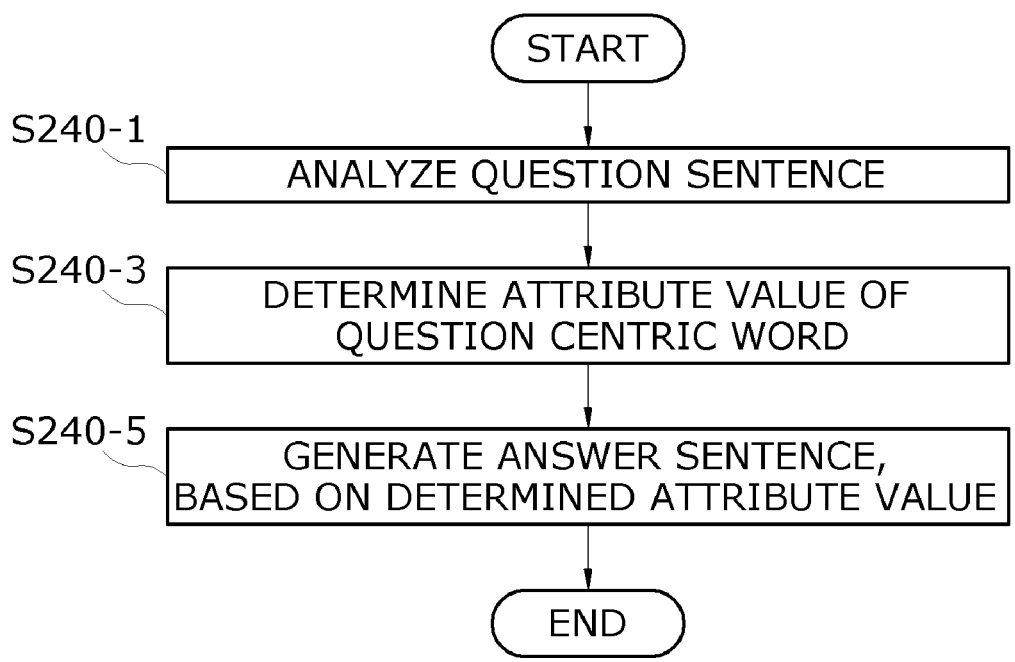
FIG. 14 is a detailed flowchart of a step (S240) illustrated in FIG. 13.

FIG. 14 is a detailed flowchart of a step (S240) illustrated in FIG. 13.

Referring to FIG. 14, in step S240-1, the server 300 may analyze a question sentence transmitted from the user terminal 100 and may recognize a question centric word in the question sentence, based on a result of the analysis.

The analysis of the question sentence may be performed based on a language processing algorithm including, for example, morphological analysis, syntax analysis, semantic analysis, and pragmatic analysis. The language processing algorithm is not the feature of the present invention, and thus, technology known to those skilled in the art is applied to a description of the language processing algorithm.

The question centric word may be defined as a word indicating a target of a question sentence. For example, in a question sentence "when is production year of this picture?", a question centric word may be "picture". In a question sentence "how much is a red bag?", a question centric word may be "bag". In a question sentence "where is here", a question centric word may be "here". In a question sentence "who is a singer singing now", a question centric word may be "sing".

Subsequently, in step S240-3, the server 300 may determine an attribute of the question centric word, based on identification information transmitted from the user terminal 100. For example, the server 300 may search a database storing the attribute information illustrated in FIG. 11 to search for a uniform resource identifier which is the same as a uniform resource identifier included in the identification information transmitted from the user terminal 100. When the same uniform resource identifier is checked in the database, attribute information (i.e., an attribute value (25 of FIG. 11)) allocated to the checked uniform resource identifier may be determined as an attribute of the question centric word.

For example, if there are a plurality of attribute values allocated to the checked uniform resource identifier, all of the plurality of attribute values may be determined as the attribute of the question centric word. For example, when the uniform resource identifier transmitted from the user terminal 100 is URI_500 and three attributes consisting of "name", "producer", and "production year" are allocated to URI_500 as illustrated in FIG. 11, all of the three attributes may be determined as the attribute of the question centric word.

Subsequently, in step S240-5, the server 300 may select a word representing the determined attribute as a right answer candidate and may generate an answer sentence including the selected right answer candidate. When there are a plurality of words representing the determined attribute, a plurality of right answer candidates may be selected. A plurality of answer sentences respectively including the plurality of right answer candidates may be transmitted to the user terminal 100. The user terminal 100 may provide the plurality of answer sentences to the user through a display screen, and the user may select a right answer desired by the user from among the displayed answer sentences.

As described above, according to the embodiments of the present invention, since an accurate answer sentence to a natural question sentence is directly provided, a cumbersome process of changing the natural question sentence to an unnatural question sentence including a hint associated with an answer sentence through conversation repeatedly performed between a questioner and the interactive question answering apparatus is omitted. Furthermore, according to the embodiments of the present invention, an accurate answer sentence is provided despite a natural question sentence which does not include a hint associated with an answer sentence or is very little in information.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An interactive question answering method in a user terminal including a computer processor communicating with a server over a communication network, the interactive question answering method comprising:

receiving, by the computer processor, multimedia content and meta-information about a plurality of entities, which are predicted to attract interest of a user in the multimedia content, from the server;

receiving, by the computer processor, a question sentence about an entity, selected from among the plurality of entities by the user, from a multimodal interface, the question sentence including insufficient hint information for obtaining an answer sentence;

extracting, by the computer processor, identification information about the entity selected by the user from the meta-information; and transmitting, by the computer processor, the identification information about the entity and the question sentence to the server and receiving the answer sentence, including a right answer candidate constrained by the identification information about the entity, as the answer sentence to the question sentence from the server, wherein the identification information is constructed to have an attribute of multimodal information output from the multimodal interface included in the user terminal, the attribute of multimodal information used as a hint information.

2. The interactive question answering method of claim 1, wherein the extracting comprises:

receiving multimodal input information for identifying the entity selected by the user from the multimodal interface;

searching for the identification information about the entity corresponding to the multimodal input information in the meta-information; and extracting the found identification information from the meta-information.

3. The interactive question answering method of claim 1, wherein the extracting comprises:

when the multimedia content is image content displayed on a display screen of the user terminal, receiving touch coordinates of the entity selected by the user from the multimodal interface; and extracting the identification information about the entity, corresponding to the received touch coordinates, from the meta-information.

4. The interactive question answering method of claim 1, wherein the extracting comprises:

when the multimedia content is video content, calculating an input time when a user voice corresponding to the question sentence is input from the multimodal interface, based on a reproduction start time of the video content; and extracting a uniform resource identifier of an entity, reproduced at the calculated input time, from the meta-information.

5. The interactive question answering method of claim 1, wherein the extracting comprises:

when the multimedia content is audio content, calculating an input time when a user voice corresponding to the question sentence is input from the multimodal interface, based on a reproduction start time of the audio content; and extracting a uniform resource identifier of an entity, included in the audio content and reproduced at the calculated input time, from the meta-information.

6. The interactive question answering method of claim 1, wherein the identification information comprises a uniform resource identifier of each of the plurality of entities, coordinates of an area where each of the plurality of entities is displayed on a display screen of the user terminal, a time section where video content including the plurality of entities is reproduced, a time section where audio content including the plurality of entities is reproduced, and an attribute name representing an attribute of each of the plurality of entities.

7. The interactive question answering method of claim 1, wherein each of the plurality of entities comprises one or more selected from the group consisting of a place name, an accident, a production year, a person, a home appliance, an article of clothing, a name of an actor, a producer, an article of clothing on an actor, shoes, a bag, a price, and a color.

8. An interactive question answering method in a server including a computer processor communicating with a user terminal over a communication network, the interactive question answering method comprising:
   generating, by the computer processor, meta-information including identification information about a plurality of entities which are predicted to attract interest of a user in multimedia content and attribute information assigned to the identification information;
   transmitting, by the computer processor, the multimedia content and the meta-information to the user terminal;
   receiving, by the computer processor, a question sentence about an entity selected from among the plurality of entities by the user and identification information about the entity, selected by the user and extracted from the meta-information, from the user terminal; and
   generating, by the computer processor, an answer sentence to the question sentence, based on attribute information assigned to the identification information about the entity selected by the user and transmitting the answer sentence to the user terminal,
   wherein the identification information is constructed to have an attribute of multimodal information output from a multimodal interface included in the user terminal, the attribute of multimodal information being used as a hint information.

9. The interactive question answering method of claim 8, wherein the generating of the meta-information comprises:
   classifying the plurality of entities which are predicted to attract interest of the user in the multimedia content, based on a pre-learned entity classification model;
   generating identification information about each of the classified plurality of entities, based on the multimodal interface; and
   generating meta-information including the generated identification information.

10. The interactive question answering method of claim 9, wherein the generating of the identification information based on the multimodal interface comprises:
    generating the identification information including an attribute of multimodal input information, for comparing the identification information with the multimodal input information output from the multimodal interface; and
    generating the meta-information including the generated identification information.

11. The interactive question answering method of claim 8, wherein the identification information comprises a uniform resource identifier of each of the plurality of entities, screen coordinates at which each of the plurality of entities is displayed on a display screen, a time section where an entity included in video content is reproduced, a time section where an entity included in audio content is reproduced, and an attribute name representing an attribute of each of the plurality of entities.

12. The interactive question answering method of claim 8, wherein the transmitting of the answer sentence to the user terminal comprises:
    analyzing a question sentence transmitted from the user terminal to recognize a question centric word in the question sentence;
    determining attribute information about the question centric word, based on the identification information transmitted from the user terminal; and
    selecting the attribute information as a right answer candidate to generate the answer sentence including the selected right answer candidate.

13. The interactive question answering method of claim 12, wherein the determining of the attribute value comprises:
    searching a database storing the attribute information to search for a uniform resource identifier which is the same as a uniform resource identifier included in the identification information transmitted from the user terminal; and
    when the same uniform resource identifier is checked in the database, determining attribute information, allocated to the checked uniform resource identifier, as an attribute of the question centric word.

14. The interactive question answering method of claim 8, wherein each of the plurality of entities comprises one or more selected from the group consisting of a place name, an accident, a production year, a person, a home appliance, an article of clothing, a name of an actor, a producer, an article of clothing on an actor, shoes, a bag, a price, and a color.

15. An interactive question answering apparatus including a server including a computer processor communicating with a user terminal over a communication network, the server comprising:
    a storage unit storing multimedia content, meta-information including identification information about a plurality of entities which are predicted to attract interest of a user in the multimedia content, and attribute information allocated to the identification information; and
    a computer processor transmitting the multimedia content and the meta-information to the user terminal, receiving a question sentence about an entity selected from among the plurality of entities by the user and identification information about the entity, selected by the user and extracted from the meta-information, from the user terminal, and generating an answer sentence to the question sentence to transmit the answer sentence to the user terminal, based on attribute information allocated to the identification information about the entity selected by the user,
    wherein the identification information is constructed to have an attribute of multimodal information output from a multimodal interface included in the user terminal, the attribute of multimodal information being used as a hint information.

16. The interactive question answering apparatus of claim 15, wherein the computer processor classifies the plurality of entities which are predicted to attract interest of the user in the multimedia content, based on a pre-learned entity classification model, generates identification information about each of the classified plurality of entities, based on the multimodal interface, and generates meta-information including the generated identification information to store the meta-information in the storage unit.

17. The interactive question answering apparatus of claim 16, wherein the computer processor generates the identification information including an attribute of multimodal input information, for comparing the identification information with the multimodal input information output from the multimodal interface.

18. The interactive question answering apparatus of claim 16, wherein the computer processor generates the meta-information including the identification information which includes a uniform resource identifier of each of the plurality of entities, screen coordinates at which each of the plurality of entities is displayed on a display screen, a time section where an entity included in video content is reproduced, a time section where an entity included in audio content is reproduced, and an attribute name representing an attribute of each of the plurality of entities, and stores the meta-information in the storage unit.

19. The interactive question answering apparatus of claim 16, wherein the computer processor analyzes a question sentence transmitted from the user terminal to recognize a question centric word in the question sentence, determines attribute information about the question centric word, based on the identification information transmitted from the user terminal, and selects the attribute information as a right answer candidate to generate the answer sentence including the selected right answer candidate.

20. The interactive question answering apparatus of claim 19, wherein the computer processor searches a database storing the attribute information to search for a uniform resource identifier which is the same as a uniform resource identifier included in the identification information transmitted from the user terminal, and when the same uniform resource identifier is checked in the database, determines attribute information, allocated to the checked uniform resource identifier, as an attribute of the question centric word.

* * * * *